Feb. 6, 1923.
G. GEISENDORFER ET AL.
LIGHT SCREENING AND DEFLECTING HOOD FOR HEADLIGHTS.
FILED FEB. 28, 1921.
1,444,739.
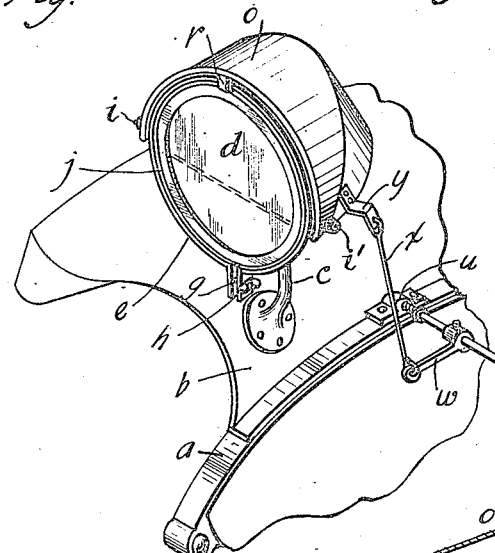
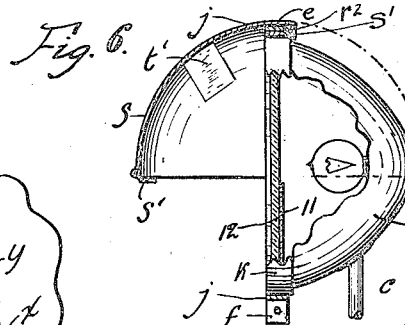
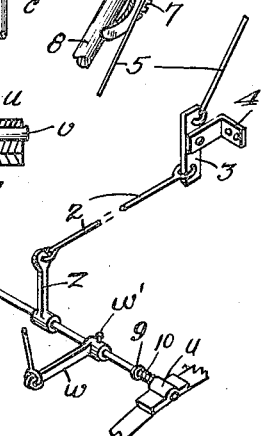
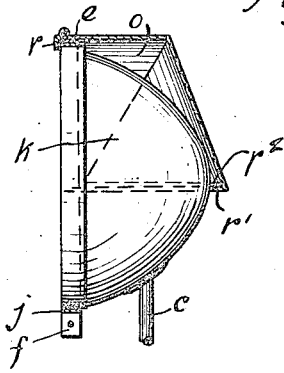
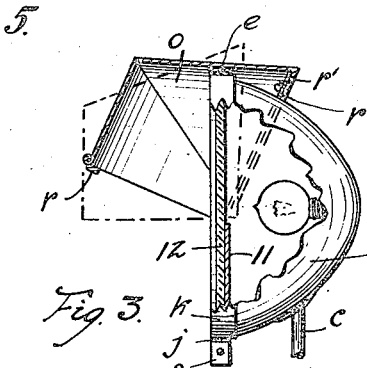
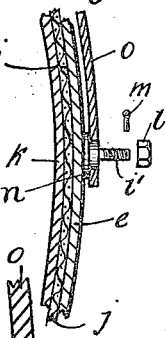
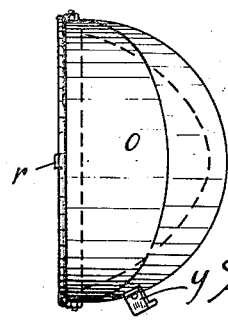
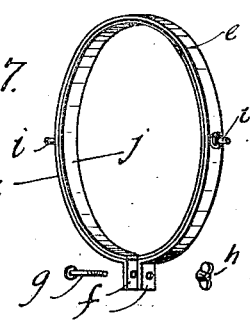
Inventors:
George Geisendorfer
Warren C. Lester Patented Feb. 6, 1923.

1,444,739

UNITED STATES PATENT OFFICE.

GEORGE GEISENDORFER AND WARREN C. LESTER, OF WARRENTON, OREGON.

LIGHT SCREENING AND DEFLECTING HOOD FOR HEADLIGHTS.

Application filed February 28, 1921. Serial No. 448,050.

*To all whom it may concern:*

Be it known that we, GEORGE GEISENDORFER and WARREN C. LESTER, citizens of the United States, and residents of the city of Warrenton, county of Clatsop, and State of Oregon, have invented a certain new and useful Improvement in Light Screening and Deflecting Hoods for Headlights, of which the following is a specification.

Our invention relates specifically to the head lights of automobiles. The object of our invention is to provide a hood or blind, for the head lights, respectively, which may be positioned so as to cover more or less of the upper parts of the lights, and thus screen those rays which have a tendency to blind the driver of an approaching vehicle.

It is, futhermore, our object to make the hoods operable from the driver's seat by a simple manipulation, so that the head-lights may be partly or entirely covered as the circumstances may require.

It is also our object to provide the interior surface of the hood of our device with a deflecting surface adapted to throw the screened rays downward and in front of the vehicle and hence, in this way, avoid diminishing the volume of light thrown on the road; indeed, having a tendency to increase the volume of light, thus rendering the driving of the vehicle easier, while at the same time avoiding the blinding of the driver of the approaching vehicle.

It is furthermore our object to make our device of a simple construction, inexpensive to manufacture, and easily applied to the auto of standard make.

The above specified and other features we attain by the device and combinations illustrated in the accompanying drawings, and hereinafter fully described.

In the drawings,

Fig. 1 shows a portion of the springs supporting the ordinary type of auto body, the fender mounted thereon, and the head-light mounted on the fender, and illustrates the application of our invention to the head-light, and also the means whereby our invention is operated so as to position the hood part of our invention to screen, more or less, the upper part of the head-light;

Fig. 1ª shows a fragment of the steering-post, and that part of the operating means of our invention mounted on such steering-post;

Fig. 2 shows an exterior view of the housing of the head-light, and, in section, one form of construction of the hood part of our invention, and the means for mounting the same on the head-light housing;

Fig. 3 also shows an exterior view of the housing of one of the head-lights, the housing being broken away to disclose the lamp and the glass, the glass being shown in section; this view illustrates how the hood part of our invention may be adjusted to screen, entirely or partially, the upper part of the head-light; this view further illustrates that the light rays of the lower part of the head-light may be provided with a screen of translucent medium in combination with our invention;

Fig. 4 is a top view of the hood-part of our device constructed as shown in Figs. 2 and 3;

Fig. 5 is a sectional detail of the hood-part of our invention, and illustrates the providing therein of the reflecting surface for reflecting the screened rays and throwing the same on the road surface in front of the vehicle;

Fig. 6 shows a modification which may be made in the construction of the hood-part of our invention; the same being here shown as made to conform substantially, with the shape of the housing of the head-lights instead of angular section;

Fig. 7 shows a detail, in perspective, of the band by which the hood-part of our invention is supported on the rim of the head-light housing; and Figs. 8, 9, and 10 show details of construction described in the body of our specification.

Referring first to Fig. 1: *a* shows one of the springs of the automobile body; *b* is the fender affixed thereon, and *c* is the post supporting one of the head-lights *d*. On the head-light is mounted a removable band *e*, a detail of which is shown in Fig. 7, the band being divided and provided with ears as *f* to receive a screw-bolt *g* on which is threaded a winged-nut *h*. The band is provided with lateral pivot pins *i* and *i'*.

In order to avoid scratching the surface of the housing of the head-light we prefer to place under the bar *e* a strip of soft material as rubber or felt *j*. *k* represents a section of the housing of the head-light. The pivot pins *i* and *i'* are threaded at their extremities for receiving a nut $l$, and to avoid the latter threading off we prefer to provide cotter-pin $m$ as illustrated in Figs. 8 and 9. The pivot pins $i$ and $i'$ are provided with shoulders $n$, and thereon is pivotally mounted the hood-part $o$ of our invention. Washers $p$ are placed on the pivot-pins, and in order to prevent rattling, a coil-spring or equivalent device is placed on the pivot pins between the washer and the nut $l$. See detail in Fig. 8.

To limit the forward and backward movement of the hood-part $o$ of our device the same is provided with stops $r$ and $r'$.

Instead of making the hood-part $o$ of angular shape the same may be made as shown in Fig. 6 by $s$, that is, curved to conform to the housing $d$ of the head-light, this type of hood also being provided with stops as $s'$.

On the interior of the hoods, $o$ or $s$, may be provided a reflecting surface as shown by $t$ in Fig. 5, and by $t'$ in Fig. 6. The reflecting surface $t$ of Fig. 5 represents a piece inserted in the hood, while the reflecting surface $t'$ of Fig. 6 may consist of a polished surface provided on the interior of the curved hood $s$. These reflecting surfaces $t$, $t'$, serve to reflect a portion of the light substantially downward in order to take advantage of such additional light directly in front of the vehicle.

The hood part of our invention is adjusted in its different positions, which are indicated by Figs. 2 and 3, by means of the devices shown in Fig. 1. On the vehicle springs $a$ are mounted bearings $u$ in which is journalled a rock-shaft $v$ provided with adjustable crank-arms $w$ secured in place by set-screw $w'$. Each of the crank-arms $w$ is connected by a rod $x$ with an arm $y$ provided on the hood. The crank-shaft $v$ also is provided with a crank-arm $z$ connected by a rod 2 with a lever 3, pivoted in a bracket 4 which is understood to be fastened to any convenient part of the vehicle adjacent the driver's seat. The lever 3 is connected by a rod 5 with a hand-lever 6 working over a notched quadrant 7, the latter device being carried by the steering post 8 as shown in Fig. 1ª.

In order to prevent rattling of the crank-shaft $v$, due to excessive lateral play, there is mounted on each of its ends a collar 9, and between the collar and the adjacent bearing $u$ is mounted a coil-spring 10.

Describing now briefly the operation of our device: By means of the hand-lever 6, and the devices connecting the same with the rock-shaft $v$, the latter may be rocked back and forth so as to place the hood $o$, or its equivalent the hood $s$, in either of its positions, as illustrated by Figs. 2 and 3, thus so placing the hood as to entirely uncover the head-light, or to partially or wholly cover the upper part of the head-light, the latter adjustments being illustrated by Fig. 3.

In case the position of the head-lights on the vehicle is such that even the rays of their lower portions will throw too much light into the eyes of the driver of the approaching vehicle, then a sheet of translucent material, as 11, of such size as to cover the lower part of the head-light glass 12 may be employed. The piece 11 being placed on the inside of the glass 12 as shown in Fig. 3.

The illustrations and description above given are merely intended to show a practical mode of construction of our device. The particular details of construction above described are, however, variable to suit the ideas of the manufacturer, provided such variation retains the essential features of our invention.

The stop $r'$ is preferably extended all around the hood $o'$ thus forming a screen protecting the driver from any light rays which might be thrown back into the driver's eyes by the reflecting surface of the hood, between the rim of the hood and the housing $k$ of the lamp. See Figs. 2 and 3.

In order to prevent any rattling of the flange-stop $r'$ against the band $j$ we prefer to line the inner face of the flange-stop $r'$ with a strip of rubber or felt or like material, as shown by $r^2$. Said lining also serves to exclude the back lash of said light rays because of bearing more or less on the exterior of the hood.

We claim:

1. The combination with a vehicle head light of a band removably clamped on said head light, a hood pivotally supported on said band and provided with a reflector adapted to be arranged in advance of the head light when the hood is in operative position, and a stop formed integral with the hood to limit the operative movement thereof, said stop being in the form of a flange to provide a light screen between the hood and head light against light rays toward the rear of the head light.

2. The combination with a vehicle head light of a band removably clamped on said head light, a hood pivotally supported on said band and provided with a reflector adapted to be arranged in advance of the head light when the hood is in operative position, a stop formed integral with the hood to limit the operative movement thereof, said stop being in the form of a flange to provide a light screen between the hood and head light against light rays toward the rear of the head light, and a flexible strip secured to said stop and bearing upon the head light to prevent rattling of the parts.

GEORGE GEISENDORFER,
WARREN C. LESTER.